(12) United States Patent
Peterkofsky et al.

(10) Patent No.: US 7,672,855 B2
(45) Date of Patent: Mar. 2, 2010

(54) TRANSPORTATION PLANNING WITH DROP TRAILER ARRANGEMENTS

(75) Inventors: Roy I. Peterkofsky, San Francisco, CA (US); Hema Budaraju, Fremont, CA (US); Mei Yang, Albany, CA (US); Rongming Sun, Hayward, CA (US); Mukundan Srinivasan, Foster City, CA (US)

(73) Assignee: Oracle International Corp., Redwood Shores, CA (US)

( * ) Notice: Subject to any disclaimer, the term of this patent is extended or adjusted under 35 U.S.C. 154(b) by 1226 days.

(21) Appl. No.: 11/067,154

(22) Filed: Feb. 25, 2005

(65) Prior Publication Data

US 2006/0195348 A1 Aug. 31, 2006

(51) Int. Cl.
*G06Q 10/00* (2006.01)
*G06F 19/00* (2006.01)
(52) U.S. Cl. .............................. 705/1; 705/7
(58) Field of Classification Search .................... 705/1, 705/7
See application file for complete search history.

(56) References Cited

U.S. PATENT DOCUMENTS

| | | | |
|---|---|---|---|
| 5,623,413 A | 4/1997 | Matheson et al. | |
| 5,666,493 A | 9/1997 | Wojcik et al. | |
| 5,758,329 A | 5/1998 | Wojcik et al. | |
| 6,529,797 B2 | 3/2003 | Williams et al. | |
| 6,560,509 B2 | 5/2003 | Williams et al. | |
| 2001/0047237 A1* | 11/2001 | Nakagawa et al. | 701/202 |
| 2002/0019759 A1* | 2/2002 | Arunapuram et al. | 705/7 |
| 2003/0084125 A1* | 5/2003 | Nagda et al. | 709/219 |
| 2004/0054549 A1* | 3/2004 | Chittenden et al. | 705/1 |
| 2004/0133458 A1 | 7/2004 | Hanrahan | |
| 2004/0167825 A1* | 8/2004 | Nadan | 705/26 |
| 2005/0228705 A1* | 10/2005 | Irwin | 705/8 |

OTHER PUBLICATIONS

"A flexible solution", European Chemical News, v 81, n 2121, p. iii(1), Oct. 25, 2004.*
Miemczyk et al., "Building cars to customer order—what does it mean for inbound logistics operations?", Journal of Business Logistics, v25n2, pp. 171-197, 2004.*
Macharis et al., "Opportunities for OR in intermodal freight transport: A review", European Journal of Operations Research 153 (2004) 400-416.*

(Continued)

*Primary Examiner*—John W Hayes
*Assistant Examiner*—Kevin Flynn
(74) *Attorney, Agent, or Firm*—Kraguljac & Kalnay, LLC

(57) ABSTRACT

Systems, methodologies, media, and other embodiments associated with transportation planning in light of drop trailer arrangements are described. One exemplary computer-implemented method embodiment includes receiving orders that describe items to be delivered to facilities as controlled by order requirements. The method may also include accessing a transportation planning model that includes information concerning shipping modes and carriers by which an order can be delivered to a facility. The transportation planning model may also include data concerning drop trailer arrangements between facilities and the carriers. The method may also include selectively consolidating orders into shipments based on the transportation planning model and the availability of a drop trailer arrangement. The method may also include selectively assigning shipments to loads based on the transportation planning model and the availability of a drop trailer action. The method may output an actionable plan of loads stored, for example, on a computer-readable medium.

24 Claims, 9 Drawing Sheets

OTHER PUBLICATIONS

"Common denominator: The integration of information systems is helping transportation operations make better decisions", Transport Technology Today, 18(6), 2001.*

Oracle Corporation, Data Sheet—Oracle Transportation Planning, pp. 1-6, Sep. 2004.

Bill Schineller, Joe's Juggling Act, Lionheart Publishing, Inc., ORMS Today, pp. 1-9, Dec. 1998.

Roy Peterkofsky, "Introducing Transportation Planning- A new Solution For You", Oracle Open World Slide Presentation, Dec. 8, 2004, pp. 1-35.

* cited by examiner

TRANSPORTATION PLANNING WITH DROP TRAILER ARRANGEMENTS

CROSS REFERENCE TO RELATED APPLICATIONS

This application Is related to the following U.S. patent applications, which are all assigned to the present assignee:

"Transportation Planning With System Assisted Exception Resolutions", Ser. No. 11/093,830 filed Mar. 30, 2005, inventors: Goassens et al., "Transportation Planning With Multi-Level Firming", Ser. No. 11/078,675 filed Mar. 11, 2005, inventors: Peterkofaky et al., "Transportation Planning With Parallel Optimization", Ser. No. 11/097,435 filed Apr. 1, 2005, inventors Sun et al., "Transportation Planning With Multi-Level Pooling Model", Ser. No. 11/113,514, filed Apr. 25, 2005, inventors Sun et al., "Optimization of Carrier Selection For Transportation Planning System", Ser. No. 11/113,906, filed Apr. 25, 2005, inventors Yadappanavar et al.

BACKGROUND

Transportation planning systems and methods may attempt to minimize transportation costs through actions like load consolidation, continuous moves, selecting carriage mode, selecting carrier, and so on. Transportation planning systems and methods may also attempt to improve situations like on-time delivery, customer satisfaction, compliance with routing guides, usage of preferred carriers, usage of volume-based pricing, and so on. At times these may produce conflicting and/or competing goals. Thus, transportation planning systems and methods may be configured to selectively make trade-offs in order to maximize, for example, an overall utility.

Transportation planning generally concerns determining how and when to ship items from sources to destinations. As used herein, transportation planning concerns determining how and when to ship items using vehicles (e.g., trucks) that may have a leave-behind and/or pickup capability (e.g., drop trailer arrangement) available at a location. While trucks are primarily described, it is to be appreciated that vehicles like roll-on roll-off airplanes, roll-on roll-off ships, trains, and the like may also have leave-behind and/or pickup capability.

A leave-behind and/or pickup capability like a drop-trailer arrangement is contrasted with a live (un)load situation. In a live (un)load situation, a driver stops and waits while his truck is (un)loaded. In a drop trailer arrangement, a driver delivers a trailer, unhooks it, and may hook up and leave with another trailer. Thus, the driver does not wait while the trailer is (un)loaded. Similarly, in some cases, a train may deliver a train car, be uncoupled from it and coupled to another without waiting for the car to be (un)loaded. Likewise, in some cases, a plane may deliver a first container, pick up a second container and take off with the second container rather than waiting around for the first container to be (un)loaded. Similarly, a ship may deliver a container, and receive another container without waiting for the container to be unloaded and reloaded.

To illustrate how a drop trailer arrangement may work, consider a facility that has a drop trailer arrangement with a specific carrier for a specific type of equipment (e.g., trailer). Due to the drop trailer arrangement, the facility may develop a "pool" of vehicles (e.g., trailers) of the specific type belonging to the specific carrier. Trailers in the pool may be in different states like loaded, unloaded, awaiting pickup, and so on.

With the pool of trailers available at the facility, a certain flexibility may be applied to delivering (un)loaded trailers to the facility and/or to picking up (un)loaded trailers from the facility. The flexibility may derive from only requiring the time/space/personnel to (un)hook a trailer(s) rather than requiring the time/space/personnel to dock and (un)load a trailer(s).

Consider a multi-stop load where a truck and trailer are loaded at a source location with a set of shipments. The truck and trailer may travel to a first location, wait while a first shipment is unloaded, may continue to a second location, wait while a second shipment is unloaded, and may then arrive at a third location where the carrier and the facility have a drop trailer arrangement for this type of trailer. Rather than wait while the third shipment is unloaded, the trailer may be unhooked and left for later unloading. Additionally, another trailer, either empty or loaded, may be available for the truck to hook up and drive away. When there is a pickup for each drop off the size of the pool of trailers may remain substantially constant and act as a buffer that may relieve time pressures associated with live (un)loading. Also, having a pool of trailers may facilitate improving dock worker utilization at a facility by facilitating a steady workflow from the pool rather than a hit or miss workflow common in non-buffered situations.

Note that in a multi-stop load like that described above, the load is typically arranged so that the facility with the drop trailer arrangement is visited last.

Unique elements of the North American regional transportation system lead to extensive truck utilization. The unique elements include long distances between major cities, an extensive high quality, government subsidized road network, relatively low fuel costs, a highly organized and competitive trucking industry, comparatively poor rail service over a relatively limited rail network, and a high level of economic activity over very dense traffic lanes. Thus, systems and methods that participate in truck based transportation planning may facilitate mitigating some inefficiencies associated with truck utilization.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
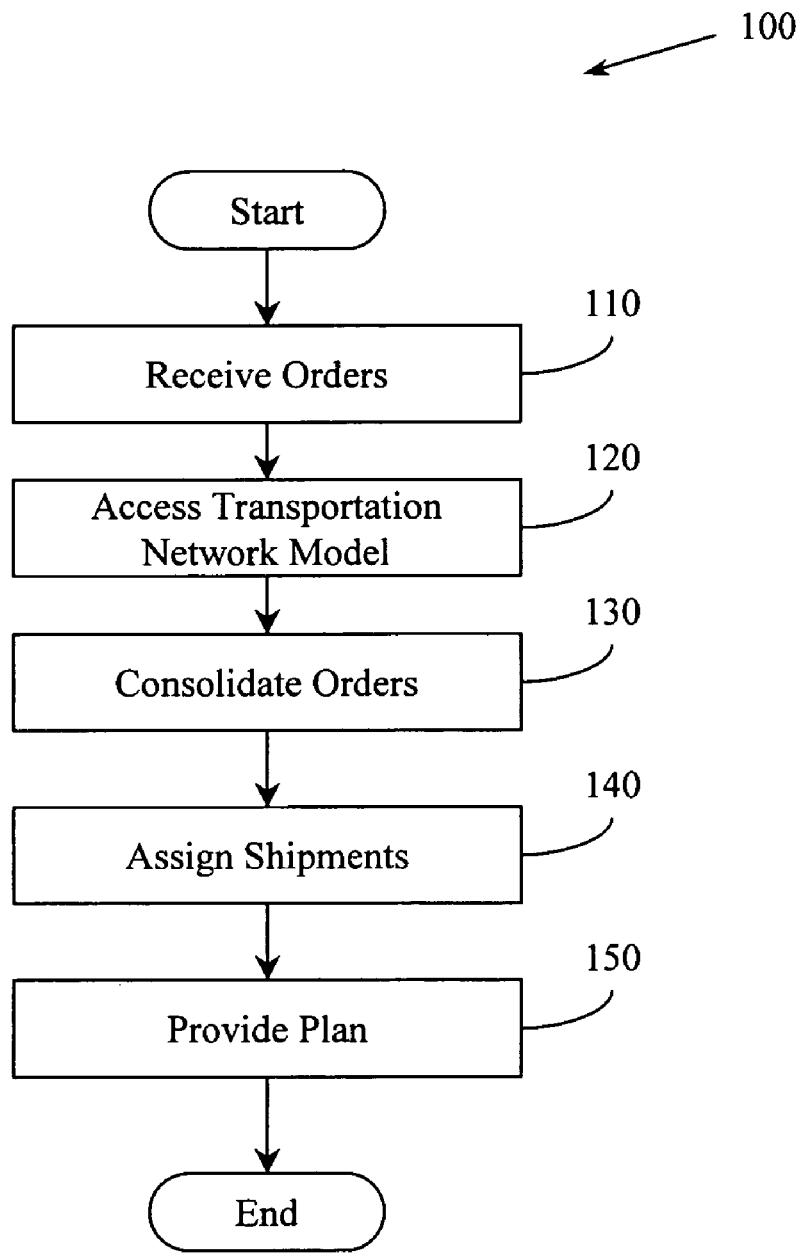
FIG. 1 illustrates an example method associated with transportation planning in light of drop trailer arrangements.

Example systems, methods, media, and other embodiments described herein relate to transportation planning in light of drop trailer arrangements. In one example, computer-based systems and methods that may consolidate orders, plan loads, and/or assign consolidated orders to loads may be configured to consider drop-trailer arrangements when consolidating, planning, and/or assigning. In another example, computer-based systems and methods that consolidate orders, route loads, and assign orders to loads may be reconfigured to re-examine consolidation, routing, and/or assigning decisions based on post-calculation examination of drop-trailer arrangements.

The following includes definitions of selected terms employed herein. The definitions include various examples and/or forms of components that fall within the scope of a term and that may be used for implementation. The examples are not intended to be limiting. Both singular and plural forms of terms may be within the definitions.

In the context of transportation planning and this application, "load" refers to a set of shipments assigned to a vehicle and assigned a schedule for delivery. A load may refer to a single stop load, a multi-stop load, and the like.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that stores instructions and/or data. A computer-readable medium may take forms, including, but not limited to, non-volatile media and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, a RAM (random access memory), a ROM (read only memory), an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software embodied as a computer readable medium having computer-executable instructions stored thereon and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software embodied as a computer readable medium having computer-executable instructions stored thereon. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, is embodied as an article of manufacture and maintained or provided as part of a computer-readable medium as defined previously. Thus, in one example the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Elements illustrated in the flow diagrams denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits such as an analog circuit, a digital signal processor circuit, an application specific integrated circuit (ASIC), or other logic device.

Figure 2:
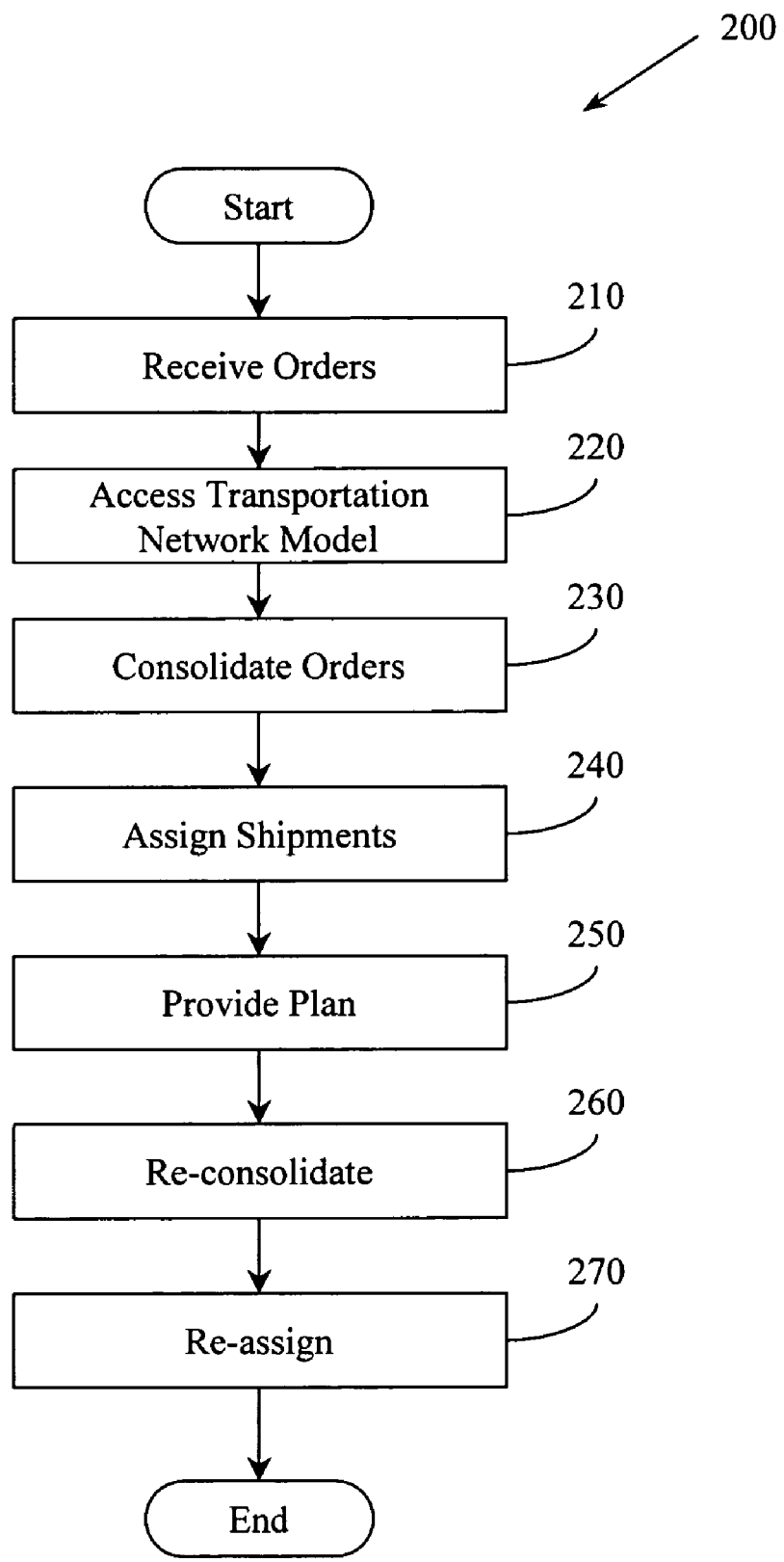
FIG. 2 illustrates another example method associated with transportation planning in light of drop trailer arrangements.

The flow diagrams of FIGS. 1 and 2, are not intended to limit the implementation of the described examples. Rather, the diagrams illustrate functional information one skilled in the art could use to design/fabricate circuits, generate software, or use a combination of hardware and software to perform the illustrated processing. It will be appreciated that electronic and software applications may involve dynamic and flexible processes and thus blocks may be performed concurrently, substantially in parallel, and/or at substantially different points in time.

FIG. 1 illustrates an example computer-implemented method 100 that is associated with transportation planning in light of drop trailer arrangements. As used herein, transportation planning refers to computer-based determining of how and when to ship items using vehicles like trucks that may have a leave-behind and/or pickup capability like a drop trailer arrangement available at a location. Method 100 may include, at 110, receiving a set of orders. An order may describe, for example, an item(s) that is to be delivered to a facility. How, when, how much to deliver, and so on may be described by order requirements associated with the order. Order requirements may include, for example, an earliest time at which the order may be picked up, a latest time at which the order may be picked up, the earliest time at which the order can be delivered, the latest time at which the order can be delivered, a source location for the order, and a destination for the order.

Method 100 may also include, at 120, accessing a transportation planning model. The transportation model may include, for example, information concerning modes by which an order may be shipped like a parcel mode, a less than truckload mode, a truckload mode, and so on. The transportation model may also include information concerning carriers by which an order can be delivered to a facility. The carriers may include, for example, parcel carriers, less than truckload carriers, truckload carriers, and so on. In some cases, a facility and a carrier may have a drop trailer arrangement whereby a trailer may be left at a facility. Thus, a driver may drop a first trailer at a facility and pick up a second trailer at the facility without waiting around for the first trailer to be (un)loaded. Therefore, the transportation planning model may also include data concerning drop trailer arrangements between facilities, carriers, and so on. The transportation planning model may also include, for example, rates charged by the carriers to carry an item(s) according to the modes, facilities from which items are carried, facilities to which the items are carried, consolidation points through which items pass, cross-docking locations across which items pass, a transportation network (e.g., roads) upon which the carriers travel, and so on.

Method 100 may also include, at 130, selectively consolidating orders into shipments. Whether orders are consolidated into shipments may depend on factors like common origins, common destinations, requirements that sets of items remain together in transit, requirements that sets of items be delivered together, the existence of an under-utilized truck moving along a path that satisfies the order, and so on. In method 100, the consolidation may also depend, at least in part, on the availability of a drop trailer arrangement as described in the transportation planning model.

Method 100 may also include, at 140, selectively assigning a shipment(s) to a load. The load may be, for example, a multi-stop load. Whether shipments are assigned to loads may depend on factors like common origins, common destinations, common pickup windows, common delivery windows, and so on. For multi-stop loads, whether shipments are assigned to loads may depend on factors like the proximity of origins, the proximity of destinations, compatibilities involving commodities, equipment, carriers, facilities, and so on. In method 100, the assignment may also depend, at least in part, on the availability of a drop trailer action as described in the transportation planning model. Thus in method 100, a load may include a drop trailer action. By way of illustration, due to the allowed time windows for pickup and/or delivery, the compatibility of different shipments for inclusion on the same multi-stop load may depend on whether a drop trailer arrangement can be utilized at the origin(s) and/or destination (s) of a shipment(s).

Method 100 may also include, at 150, providing an actionable plan of loads for delivering shipments to facilities. The actionable plan may be provided, for example, on a computer-readable medium like a disk, a CD, a DVD, and so on. In one example, the actionable plan and/or portions thereof may be distributed to carriers by, for example, the Internet. In this case, the computer-readable medium may take the form of a carrier wave. The loads may be described by data including, for example, a start time, a start location, a sequenced set of stops, a drop trailer instruction, a pickup trailer instruction, and a set of shipments involved in the load. It is to be appreciated that in some examples a load may include multiple stops, that some items may be dropped off at a stop and that other items may be picked up at a stop. Furthermore, it is to be appreciated that a load as provided by method 100 may include a drop trailer action whereby a trailer is either dropped off and/or picked up at a stop. Most often a trailer will be picked up or dropped off at the first or last stop.

In some examples, the actionable plan provided by method 100 improves on conventional actionable plans because it includes drop trailer arrangements and thus may include more efficient multi-stop loads that may not have appeared feasible or that may have appeared less desirable if not for considering drop trailer arrangements. Thus, in one example, the actionable plan may facilitate improving a utility measurement associated with satisfying the set of orders as compared to an actionable plan that does not consider drop trailer actions. In another example, the actionable plan may facilitate optimizing a utility measurement associated with satisfying the set of orders. The utility measurement may consider the relative and overall value of factors like reducing load cost, reducing order cost, improving order compliance with rules, laws, preferences (e.g., shipper preference, carrier preference, receiver preference, driver preference), improving truck utilization percentages, reducing spoilage, reducing breakage, improving on time delivery, and so on. Reducing costs may include, for example, reducing the total number of miles traveled, acquiring a lower unit cost for an order, moving an order from a parcel mode to a truckload mode, moving an order from a less than truckload mode to a truckload mode, and so on.

In one example, a decision concerning whether to consolidate an order(s) into a shipment(s) includes identifying consolidation opportunities. In different examples, consolidation opportunities may include, for example, a simple consolidation opportunity, a single tier pooling opportunity, a multi-tier pooling opportunity, a cross docking opportunity, and a multi-stop load opportunity. Examples of these consolidation opportunities are described in association with FIGS. 8 and 9.

As is known in the art, there are a variety of algorithms and processes by which items can be selected to be included or not included in a group like a consolidated order and/or multi-stop load. However, these algorithms conventionally may not have considered the possibility of drop trailer arrangements and their effect on the selection process. The algorithms may be implemented, for example, in processes including, but not limited to, linear programming consolidation processes, simplex method consolidation processes, dynamic programming consolidation processes, greedy algorithm consolidation processes, look ahead consolidation processes, divide and conquer consolidation processes, branch and bound processes, savings-based processes, heuristic-based processes, and the like.

Dynamic programming is used to solve optimization problems that may require testing many possible solutions. When presented with a set of orders, many possible solutions for consolidation, routing, load assignment, and so on may be available. Conventionally, dynamic programming techniques may not have factored in the availability of drop-trailer arrangements when calculating acceptable and/or optimal solutions in the transportation planning field. Thus, example systems and methods described herein include in the solutions for transportation planning problems the possibility that a drop trailer arrangement may exist.

Dynamic programming involves breaking problems into dependent sub-problems, solving the sub-problems, and saving the solutions to reuse when applicable. Example systems and methods described herein may include in the sub-problems considering the affect of a drop-trailer arrangement on a consolidation, routing, and/or assignment sub-problem. For example, one sub-problem may include identifying routes that include exactly one drop-trailer arrangement while another sub-problem may involve identifying all orders destined for a location that has a drop trailer arrangement. In dynamic programming, the single best solution is referred to as the optimal solution. In some examples, neither the time nor the computing cycles may be available to compute an optimal solution. In other examples, a sub-optimal solution may be acceptable, particularly if it can be computed within a desired time frame. Thus, example systems and methods described herein may employ dynamic programming solutions that are configured to produce a "good-enough" solution that may then be improved by considering available drop-trailer arrangements. While dynamic programming is described, it is to be appreciated that similar improvements may be made in other techniques like greedy algorithms, divide and conquer, and so on.

Greedy algorithms concern a general algorithm design paradigm that rests on the consideration of configurations and objective functions. A configuration describes different choices to make, different collections to assemble, different values to find, and so on. An objective function describes a score that may be assigned to candidate configurations. Thus, transportation planning may employ greedy algorithms whose objective functions concern cost and/or utility and whose configurations describe orders, consolidations, routes, assignments, and so on. Greedy algorithms seek to maximize or minimize the objective function. A greedy algorithm builds a solution by keeping the best result for a smaller problem and adding that result to a current sub-solution. One example smaller problem may be identifying loads that violate an hours of service rule and another smaller problem may be identifying trucks that are under-utilized. A greedy algorithm tends to make the best choice at the moment in the hope that this will lead to an optimal and/or acceptable solution in the long run. Example greedy algorithms include Dijkstra's shortest path algorithm, Prim/Kruskal's MST algorithm, and so on. Greedy algorithms are typically employed to solve task scheduling and knapsack like problems. When considering drop-trailer arrangements, greedy algorithms may be adapted by reconfiguring the objective function to reward drop trailer arrangements, to penalize missed drop-trailer opportunities, by adding parameters to the configurations that discourage certain immediate choices, and so on.

In one example, a greedy (or other) type of algorithm may be modified to either narrow or widen the choices available at any point in the process to reflect the impact of drop trailer arrangements and to reward decisions that put a drop trailer opportunity into the proper position (e.g., first stop, last stop) within a load. Thus, by considering drop trailer arrangements, greedy and other algorithms may be able to identify opportunities for loads that are superior (e.g., more cost effective, higher utility) than those possible in the absence of drop trailer arrangements.

A look ahead algorithm does not necessarily make the best choice at the moment, but rather makes "tentative" decisions and determines the best result based on subsequent decisions. Look ahead algorithms are familiar to those involved in chess programming. Divide and conquer programming involves breaking problems into independent sub-problems and solving the sub-problems. Linear programming is used to solve problems that involve limited resources, an overall objective, and a choice of actions to be taken. The simplex method is a pre-eminent tool in linear programming.

To accommodate drop-trailer actions, these and other conventional techniques may be updated to make selections based, for example, on the desirability of including only one location with a drop trailer arrangement per set of shipments to facilitate leaving other drop trailer arrangements for subsequent consolidations, the desirability of including at least one location with a drop trailer arrangement in a set of shipments, and so on. Additionally, and/or alternatively, decisions may not be made solely on the desirability of including drop trailer arrangements in a plan but also, for example, on the desirability of plan decisions that become feasible in the presence of drop trailer arrangements. Similarly, these techniques may be updated to make selections where at least one selection is "pre-selected" as a "last on" selection based on the availability of a drop-trailer arrangement at that pre-selected location. While pre-selecting and so on, it is to be appreciated that these techniques may be altered in other manners to consider drop-trailer arrangements. In one example, the availability of drop-trailer arrangements may be considered while initial consolidations are being made. In another example, the availability of drop-trailer arrangements may be considered after initial consolidations have been made.

In one example, selectively assigning shipments to loads includes identifying a routing opportunity for a shipment(s). A routing opportunity may include, for example, a single stop routing opportunity, a multi-stop routing opportunity, a continuous move opportunity, and so on. In method 100, a routing opportunity may include a drop-trailer action. A continuous move is a sequence of loads that a single vehicle can serve as one mission. A continuous move may have empty movements between loaded legs.

Once again, routing algorithms known in the art may include, but are not limited to, linear programming routing processes, simplex method routing processes, dynamic programming routing processes, greedy algorithm routing processes, look ahead routing processes, divide and conquer routing processes, branch and bound processes, savings-based processes, heuristic-based processes, and so on. These algorithms may be updated to consider drop trailer arrangements in routing like they were updated to consider drop trailer arrangements in consolidation. For example, from a set of destinations a subset of destinations may be reserved as "final destinations" based on having drop trailer arrangements available. Similarly, from a set of sources, a subset of sources may be reserved as "initial sources" based on having drop trailer arrangements available. By way of illustration, in a divide and conquer approach, divisions may be made in a manner that facilitates partitioning the "final destinations" with drop trailer arrangements so that a maximum number of divisions remain drop trailer capable. By way of further illustration, in a greedy algorithm approach, an immediate decision value may be manipulated to receive a higher score if the immediate decision will complete a load and the immediate decision will add a drop trailer facility to the end of the load while an immediate decision value may be manipulated to receive a lower score if the immediate decision will not complete a load and the immediate decision will add a second drop trailer facility to a load that already includes a drop trailer facility. It is to be appreciated that the updates to the divide and conquer algorithms and the greedy algorithms are merely examples and that other updates may be employed.

Considering drop trailer arrangements in method 100 facilitates taking actions that are not conventionally possible. For example, method 100 facilitates relaxing a constraint associated with facility operation time. By way of illustration, conventionally a transportation planning method may include as a hard constraint the times at which a delivery may be made at a facility or the times at which an order may be picked up from a facility. If a drop trailer arrangement exists for the facility and a carrier, these time constraints may in some cases be ignored. These constraints may only need to be applied to live (un)loading since it may only occur during hours when a facility is staffed, open for operations, and has available dock and worker capacity. Conversely, with appropriate drop trailer arrangements, a trailer may be dropped at other times for later (un)loading. This facilitates eliminating a constraint from the consolidation and/or routing algorithms and thus facilitates reducing the overall complexity of such algorithms. Furthermore, this facilitates making certain decisions feasible that otherwise would not be, thus allowing a broader set of solutions and potentially allowing the chosen solution to achieve higher values for relevant utility functions. Additionally, this facilitates making available at a lower cost and/or higher utility other solutions that were feasible at a higher cost due, for example, to charges related to delaying a truck and driver until a facility is open, staffed, and has capacity if the charges may be avoided if the truck and driver do not have to wait.

While FIG. 1 illustrates various actions occurring in serial, it is to be appreciated that various actions illustrated in FIG. 1 could occur substantially in parallel. By way of illustration, a first process could receive orders, a second process could access a transportation planning model, a third process could consolidate orders to shipments, a fourth process could assign shipments to loads, and a fifth process could provide actionable load data. While five processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform a method that includes receiving a set of orders that describe items to be delivered to facilities as controlled, at least in part, by order requirements. The method may also include accessing a transportation planning model that includes information concerning modes and carriers by which an order can be delivered to a facility. The transportation planning model may also include drop trailer arrangement data concerning the facilities and the carriers. The method may also include selectively consolidating orders into shipments based, at least in part, on the transportation planning model and the availability of a drop trailer arrangement. The method may also include selectively assigning shipments to loads based, at least in part, on the transportation planning model and the availability of a drop trailer action. Finally, the method may include providing an actionable plan of loads for delivering the shipments to the facilities. While the above method is described being stored on a computer-readable medium, it is to be appreciated that other example methods described herein can also be stored on a computer-readable medium.

FIG. 2 illustrates an example method 200 associated with transportation planning in light of drop trailer arrangements. Method 200 includes actions 210 through 250 similar to actions 110 through 150 in method 100. In method 200, consolidations may initially be made at 230 without considering drop trailer arrangements or, at 230, algorithms may be reconfigured to partially consider drop trailer arrangements. Thus method 200 may also include, at 260, re-examining consolidations to consider drop-trailer arrangements. Similarly, at 240, assignments may initially be made without considering drop trailer arrangements. Thus, method 200 may also include, at 270, re-examining assignments to consider drop-trailer arrangements. Thus, method 200 may be implemented to reconfigure an existing method or to re-optimize a plan based on additional drop-trailer considerations. This may facilitate, for example, determining an initial plan, communicating that plan to carriers, and then responding to carrier information concerning drop-trailer possibilities and re-optimizing the plan based on this "just in time" information.

Figure 3:
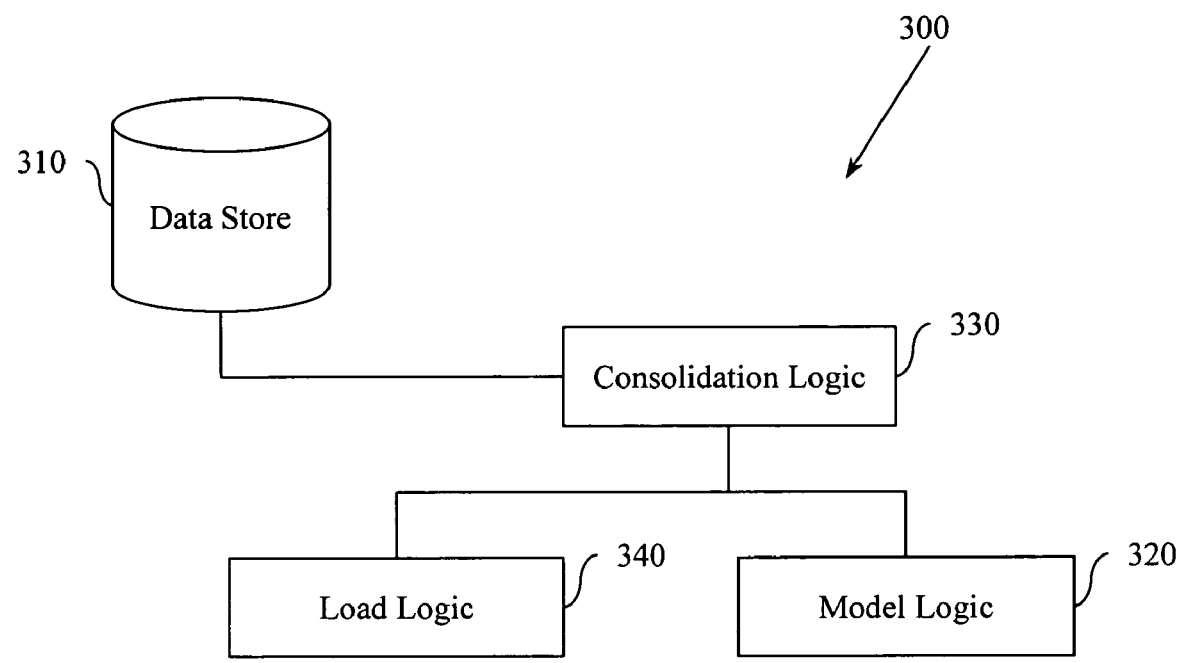
FIG. 3 illustrates an example system associated with transportation planning in light of drop trailer arrangements.

FIG. 3 illustrates an example system 300 associated with transportation planning in light of drop trailer arrangements. System 300 includes data store 310 that is configured to store orders. An order describes an item(s) to be delivered to a facility in accordance with an order requirement.

System 300 also includes a model logic 320 that is configured to access a shipping model. The shipping model may describe, for example, shipping modes, carriers, facilities, a transportation network, and drop trailer arrangements between the facilities and the carriers. Additionally, the shipping model may include data concerning factors relevant to shipping an item from a source to a destination like a transportation network configuration, the capacity of various types of equipment, transit times across portions of the transportation network, commodity to commodity compatibilities, commodity to equipment compatibilities, commodity to facility compatibilities, commodity to carrier compatibilities, facility to equipment compatibilities, rules for carriers, carrier limits, laws concerning hours of service for drivers and/or equipment, days on which a facility may be open, hours during which a facility may operate, the availability of equipment (e.g., tractors, trailers), the availability of drivers, the capacity of a facility, carrier pickup lead times, ship sets (e.g., groups of items that need to be shipped together), and so on.

System 300 may also include a consolidation logic 330 that is configured to consolidate orders into shipments. The consolidation logic 330 may be operably connected to data store 310 and model logic 320. Whether and/or how orders are consolidated into shipments may depend, for example, on the shipping model and the availability of drop trailer possibilities. In one example, consolidation logic 330 may be configured to identify a consolidation opportunity and then to make consolidations based on the identified opportunities. Opportunities may be identified using, for example, a linear programming selection process, a simplex method selection process, a dynamic programming selection process, a greedy selection process, a look ahead selection process, a divide and conquer selection process, a branch and bound process, a savings-based process, a heuristic-based process, and so on. In one example, consolidation logic 330 may be configured to perform these processes in a manner that considers the availability and/or affect of a drop-trailer arrangement. Opportunities may include, for example, simple consolidation opportunities, single tier pooling opportunities, multi-tier pooling opportunities, cross docking opportunities, multi-stop pooling opportunities, and so on.

System 300 may also include a load logic 340 that is configured to assign shipments to loads. Once again, whether and/or how shipments are assigned to loads may depend, at least in part, on the shipping model and the availability of drop trailer possibilities. System 300 facilitates determining loads that may include a drop trailer action. In one example, including a drop trailer arrangement in a load may facilitate violating a facility operation time constraint described in the shipping model.

In one example, load logic 340 may be configured to identify a routing opportunity using techniques like those described above (e.g., linear programming, simplex method, dynamic programming, greedy algorithms, divide and conquer). The routing opportunities identified by the load logic 340 may include, for example, single stop routes, multi-stop routes, continuous moves, and so on. Load logic 340 may be configured to consider drop-trailer arrangements as part of routing opportunities. Thus, load logic 340 may be configured to assign shipments to loads based, at least in part, on the routing opportunity and the availability of a drop trailer arrangement.

The following examples illustrate different results that may be achieved using example systems and methods described herein when compared to conventional systems. Consider the following two order OD1 may concern an item available at facility O that is to be delivered to facility orders. A first D1. OD1 may have a pickup window on Monday from 9 am to 11 am, and a flexible delivery window. A second order OD2 may concern an item available at facility O that is to be delivered to facility D2. OD2 may have a pickup window on Monday from 9 am to 11 am (the same as OD1) and a delivery time window of Tuesday from 8 am to 12 pm. Each order may take one hour to load and each order may take one hour to unload. All three of the facilities, O, D1, and D2 are open twenty four hours from Monday through Friday.

Now assume that a first carrier C1 provides a truckload (TL) service from O to D1/D2 with the loaded-distance charge of $1/mile, and has a layover setting for maximum on duty time in any twenty four hour period of fourteen hours with a weekday layover charge of $100. Also assume that carrier C1 has a drop trailer arrangement with facility D2.

Assume that D1 is 200 miles from O and it takes 3 hours to drive from O to D1. Assume that D2 is 170 miles from O and that it also takes 3 hours to drive from 0 to D2. Further assume that D1 is 60 miles from D2 and that it takes 1 hour to drive from D1 to D2 and from D2 to D1. Conventional systems that do not consider the drop trailer arrangement between carrier C1 and facility D2 would produce two sub-optimal solutions. The first sub-optimal solution is a load from O to D1 to D2. The scheduling of this truckload is as follows (unit=hour):

```
At O                    At D1        At D2
 |        |       |         |       |          |
Load 2  Drive 3  Unload 1  Drive 1  Layover 16  Unload 1
Mon. 9 am  11 am  2 pm    3 pm      4 pm        Tue. 8 am  9 am
```
Total cost = distance charge + layover cost = $1 * (200 + 60) + $100 = $360.

The second sub-optimal solution is a load from O to D2 to D1. The scheduling of this truckload is as follows (unit=hour):

```
At O                              At D2              At D1
 |        |       |                |       |          |
Load 2  Drive 3  Layover 18      Unload 1  Drive 1   Unload 1
Mon. 9 am  11 am  2 pm          Tue. 8 am  9 am      10 am  11 am
```
Total cost = distance charge + layover cost = $1 * (170 + 60) + $100 = $330.

A layover charge may be assessed if the truck physically arrives at D2 with enough time to finish unloading during typically accepted "regular business hours" (e.g., at 4 p.m. if regular hours last until 5 p.m.) but is not actually unloaded until the next day. A weekday layover charge is typically incurred when a truck arrives with enough time to finish (un)loading within defined regular business hours but is delayed until the next business day due to other factors like, in this case, the allowed delivery window for the order.

A conventional system that does not consider the drop-trailer arrangement will select the second load as the best choice, even though it is sub-optimal. Example systems and methods described herein, however, will consider the drop trailer arrangement between carrier C1 and facility D2. When considering the drop trailer arrangement, two loads may be examined. A first load starts at O and proceeds in order to D1 and D2. Since carrier C1 has a drop trailer arrangement with facility D2, and D2 is the last stop in this load, when the driver reaches D2, the driver can immediately drop the trailer and ignore the early delivery time associated with order OD2. Thus, the layover charge at facility D2 is avoided.

The scheduling of this truckload will now be as follows:

```
At O                    At D1             At D2
 |        |       |         |       |          |
Load 2  Drive 3  Unload 1  Drive 1  Unload 1
Mon. 9 am  11 am  2 pm     3 pm     4 pm  5 pm
```
Total cost = distance charge + layover cost = $1 * (200 + 60) + $0 = $260.

A second load that will be considered starts at O and proceeds in order from D2 to D1. Since D2 is not the last stop, the drop trailer arrangement between C1 and D2 can not be used and thus the scheduling and the total cost of this truckload will be the same as that in a conventional system where Total cost=distance charge+layover cost=$1*(170+60)+$100=$330. Thus, by considering the drop-trailer arrangement, a lower cost of $260 is found and a drop-trailer arrangement will be used. In this example, the consolidation, routing, and/or assignment algorithms may have operated in a typical manner. However by simply adding the consideration of drop-trailer arrangements, a lower cost was found. In other examples, the algorithms may have been reconfigured to operate differently. For example, the algorithms may have reserved certain destinations as "final destinations", or may have identified certain destinations as "preferred destinations" based on the availability of a drop trailer arrangement.

A second example illustrates another way in which example systems and methods may provide improvements over conventional systems that do not consider drop trailer arrangements. Consider two orders, both of which will take one hour to load, five hours to drive, and two hours to unload and each of which may utilize forty five percent of a truck's capacity. The first order originates at O and goes to destination D1. The second order originates at O and goes to destination D2. Each of these loads would take eight hours to complete in isolation. Now consider that it may take one hour to drive from D1 to D2 or from D2 to D1. Also consider that a drop trailer arrangement may exist at D2, that a driver may be restricted to 10.5 hours on duty (e.g., driving, (un)loading, waiting) in a day and that both the first order and the second order must be delivered on the same day that they are picked up.

A conventional system would likely schedule two trucks, each of which would have forty five percent space utilization and each of which would use eight hours of the 10.5 available on-duty hours. If the drop trailer arrangement is not considered, two trucks would be required because a single driver could not complete both orders on the same day while staying at or below 10.5 hours of service. But example systems and methods would likely schedule a single truck that first goes to D1 and then to D2 and simply drops the trailer at D2. The single truck would have ninety percent utilization, would use ten of the 10.5 available on-duty hours and would likely have an overall lower cost while improving utility.

Figure 4:
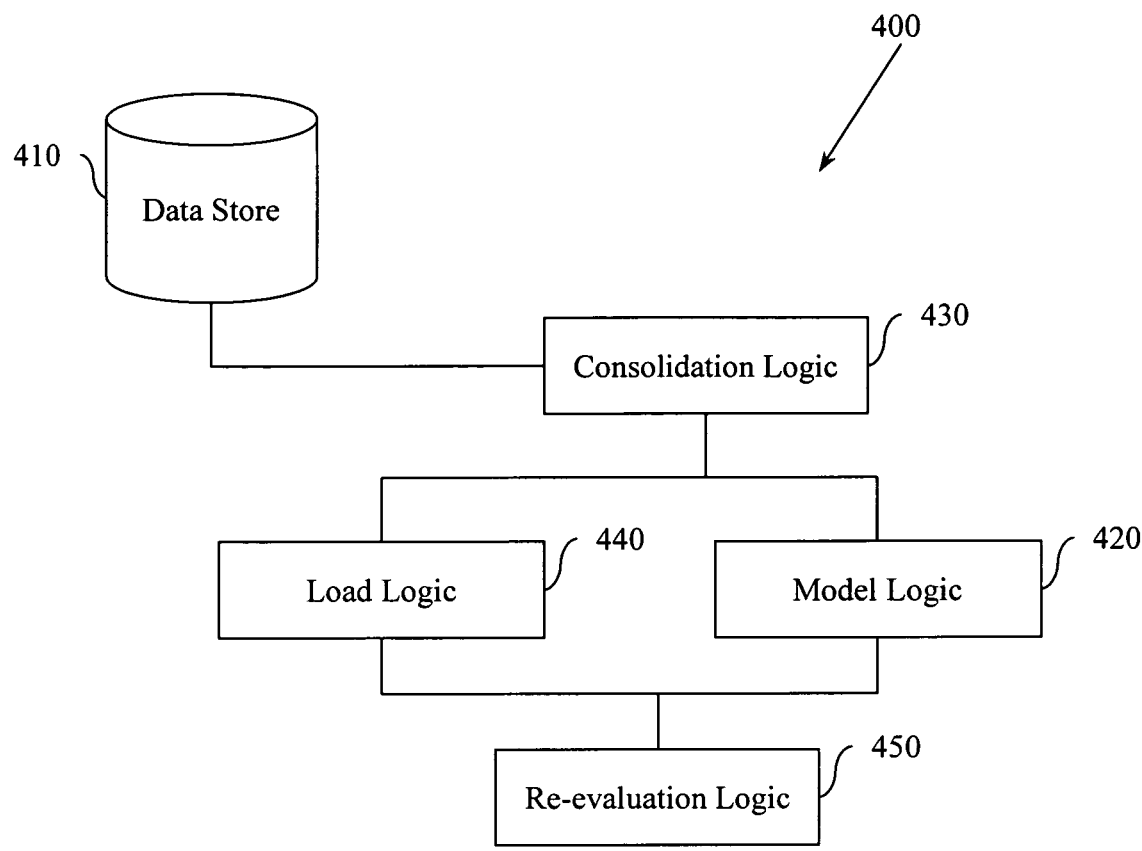
FIG. 4 illustrates another example system associated with transportation planning in light of drop trailer arrangements.

FIG. 4 illustrates an example system 400 associated with transportation planning in light of drop trailer arrangements. System 400 includes components 410 through 440 similar to components 310 through 340. Additionally, system 400 may include a re-evaluation logic 450 that is configured to reconfigure a load based on the availability of a drop trailer arrangement. For example, a conventional system may produce an actionable plan of loads. It may be unwieldy and/or impossible to reconfigure the algorithms used by the conventional system for consolidation, routing, and/or assignment. Thus, re-evaluation logic 450 may be provided to facilitate examining the actionable plan provided by the conventional system to identify any optimizing possibilities associated with drop trailer arrangements.

Figure 5:
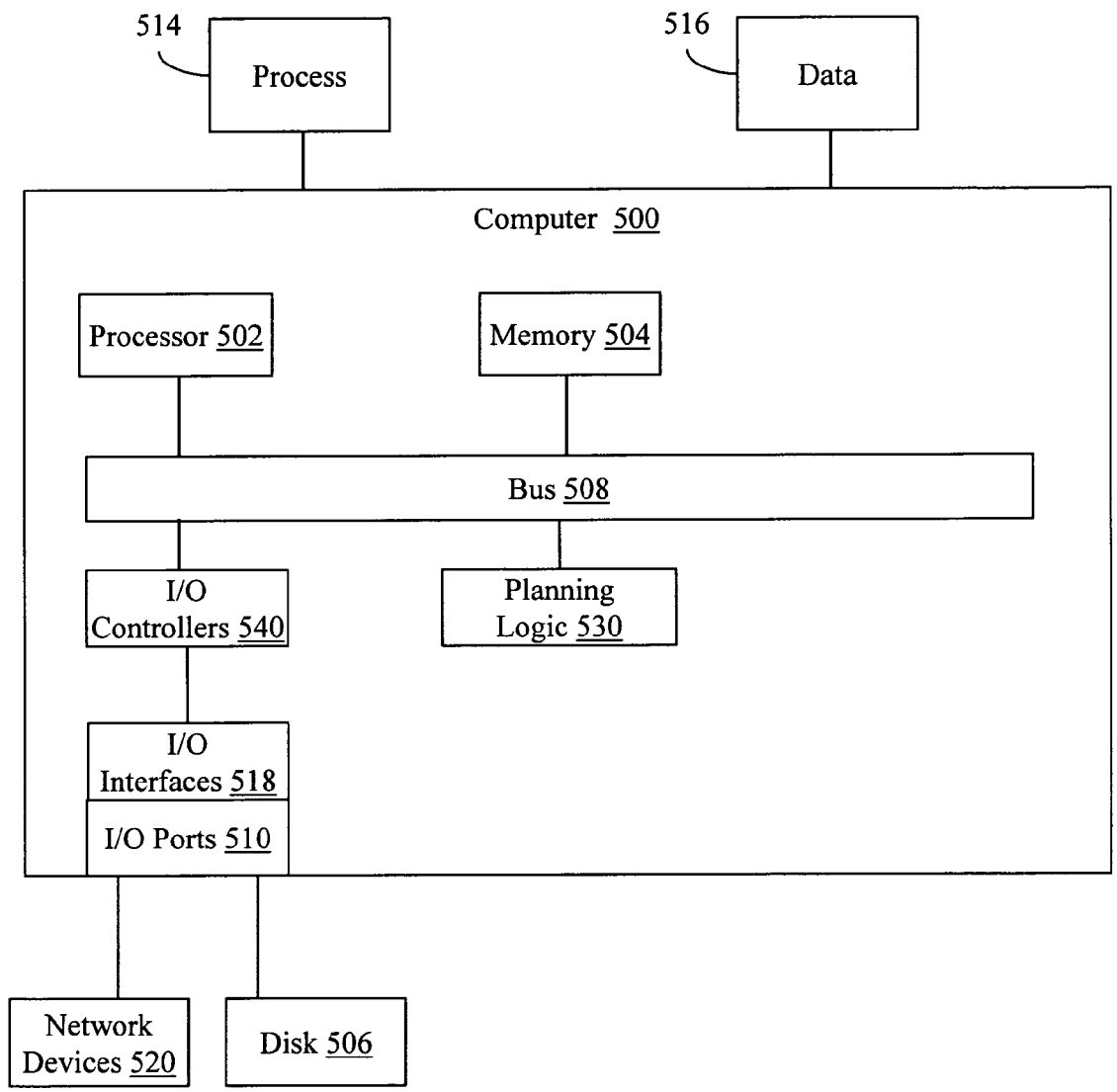
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include a planning logic 530 that is configured to facilitate transportation planning in light of drop trailer arrangements. Planning logic 530 may implement portions of example systems described herein and may execute portions of example methods described herein. Thus, whether implemented in hardware, software, firmware, and/or combinations thereof, planning logic 530 and computer 500 may provide means for analyzing a transportation model that includes drop trailer arrangement data, means for determining how orders may be grouped together into shipments based, at least in part, on the transportation model and possible drop trailer arrangements, means for determining how shipments may be routed together into loads based, at least in part, on the transportation model and possible drop trailer actions, and means for providing a set of instructions concerning the loads.

Generally describing an example configuration of computer 500, processor 502 can be a variety of various processors including dual microprocessor and other multi-processor architectures. Memory 504 can include volatile memory and/or non-volatile memory. Disk 506 may be operably connected to computer 500 via, for example, an input/output interface (e.g., card, device) 518 and an input/output port 510. Disk 506 can include, but is not limited to, devices like a magnetic disk drive, a solid state disk drive, a floppy disk drive, a tape drive, a Zip drive, a flash memory card, and/or a memory stick. Furthermore, disk 506 can include optical drives like a CD-ROM, a CD recordable drive (CD-R drive), a CD rewriteable drive (CD-RW drive), and/or a digital video ROM drive (DVD ROM). The memory 504 can store processes 514 and/or data 516, for example. Disk 506 and/or memory 504 can store an operating system that controls and allocates resources of computer 500.

Bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet).

Computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and the like. Input/output ports 510 can include but are not limited to, serial ports, parallel ports, and USB ports.

Computer 500 can operate in a network environment and thus may be connected to network devices 520 via i/o devices 518, and/or i/o ports 510. Through network devices 520, computer 500 may interact with a network. Through the network, computer 500 may be logically connected to remote computers. The networks with which computer 500 may interact include, but are not limited to, a local area network (LAN), a wide area network (WAN), and other networks. Network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, network devices 520 can connect to WAN technologies including, but not limited to, point to point links, circuit switching networks like integrated services digital networks (ISDN), packet switching networks, and digital subscriber lines (DSL).

Figure 6:
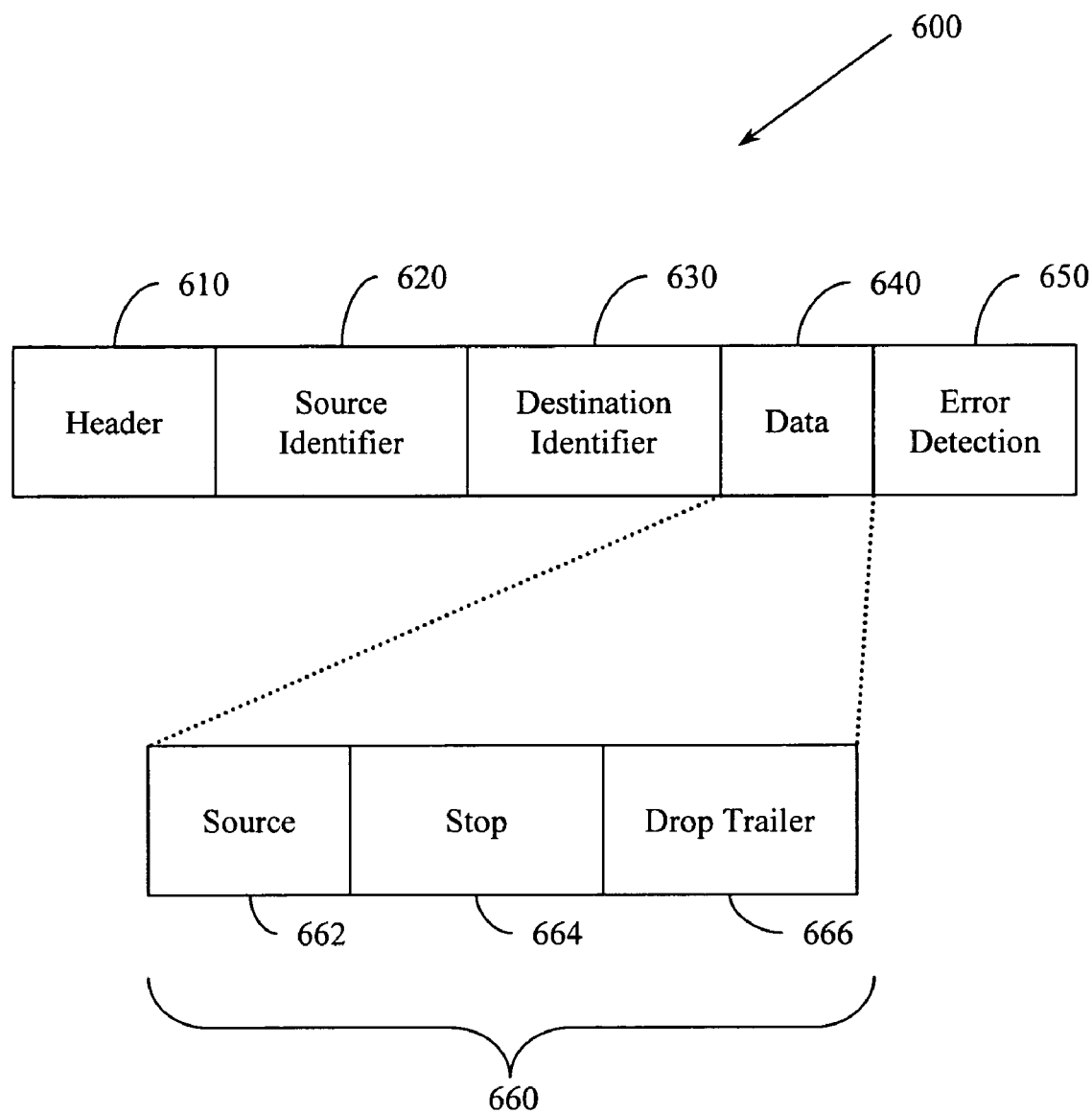
FIG. 6 illustrates an example data packet and illustrates example subfields within the example data packet.

Referring now to FIG. 6, information can be transmitted between various computer components and/or logics associated with transportation planning in light of drop trailer arrangements as described herein via a data packet 600. Data packet 600 may be employed, for example, to communicate data associated with a load. The data packet 600 includes a header field 610 that includes information like the length and type of packet. A source identifier 620 follows the header field 610 and includes, for example, an address of the computer component and/or logic from which the packet 600 originated. Following the source identifier 620, the packet 600 includes a destination identifier 630 that holds, for example, an address of the computer component and/or logic to which the packet 600 is ultimately destined. Source and destination identifiers can be, for example, a globally unique identifier (GUID), a uniform resource locator (URLs), a path name, and the like. The data field 640 in the packet 600 includes various information intended for the receiving computer component and/or logic. The data packet 600 ends with an error detecting and/or correcting field 650 whereby a computer component and/or logic can determine if it has property received the packet 600. While five fields are illustrated in a certain order, it is to be appreciated that a greater and/or lesser number of fields arranged in different orders can be present in example data packets.

FIG. 6 also illustrates sub-fields 660 within the data field 640. The subfields 660 discussed are merely exemplary and it is to be appreciated that a greater and/or lesser number of sub-fields could be employed with various types of data germane to transportation planning in light of drop trailer arrangements. In one example, data packet 600 may be employed to transmit load data to, for example, a carrier. Thus, the sub-fields 660 include a first field 662 that holds, for example, a source data like an origination point, a pickup window, and so on. Sub-fields 660 may also include a second field 664 that holds, for example, a sequence of stops data including, for example, delivery time windows, shipment(s) to be delivered at the stop, and so on. Sub-fields 660 may also include a third field 666 that holds, for example, a drop trailer arrangement data. For example, the drop trailer arrangement data may include directions concerning "open hours" arrivals, "closed hour" arrivals, a trailer to drop, a trailer to pick up, and so on.

Figure 7:
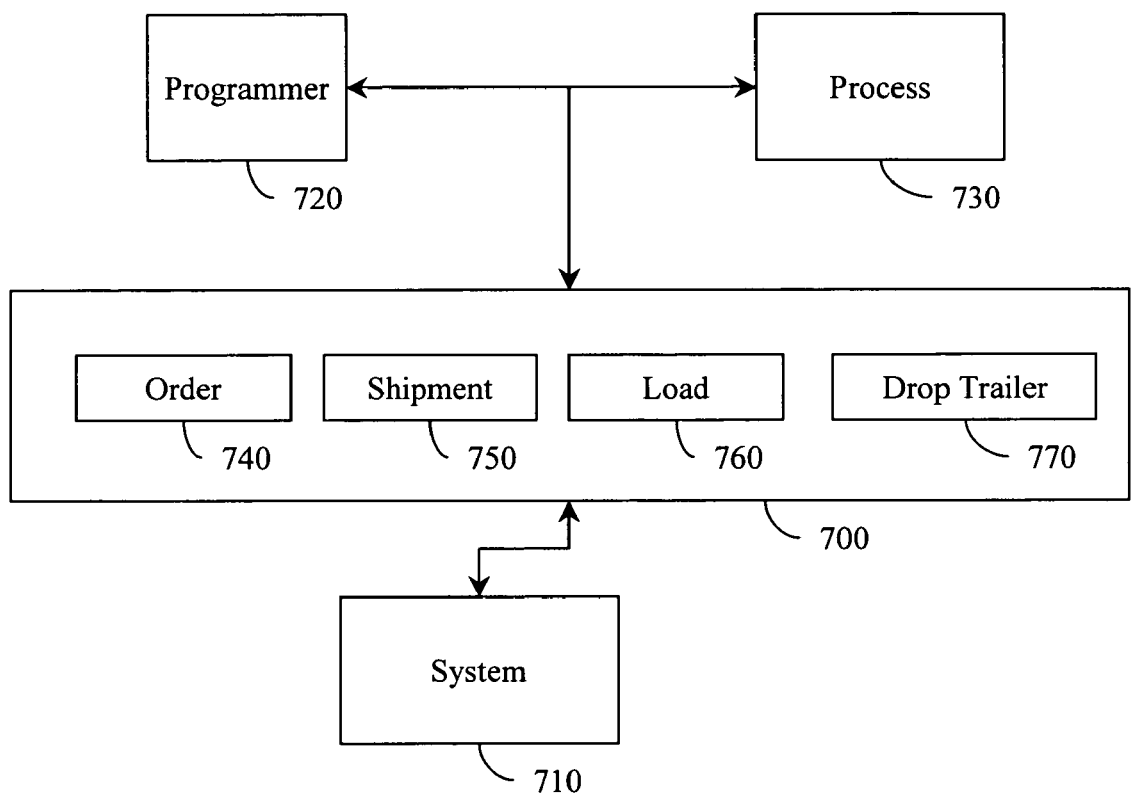
FIG. 7 illustrates an example application programming interface (API).

Referring now to FIG. 7, an application programming interface (API) 700 is illustrated providing access to a system 710 for transportation planning in light of drop trailer arrangements. API 700 can be employed, for example, by a programmer 720 and/or a process 730 to gain access to processing performed by system 710. For example, a programmer 720 can write a program to access system 710 (e.g., invoke its operation, monitor its operation, control its operation) where writing the program is facilitated by the presence of API 700. Rather than programmer 720 having to understand the internals of system 710, programmer 720 merely has to learn the interface to system 710. This facilitates encapsulating the functionality of system 710 while exposing that functionality.

API 700 can be employed to provide data values to system 710 and/or retrieve data values from system 710. For example, a process 730 that identifies consolidation opportunities can provide consolidation data to system 710 via API 700 by, for example, using a call provided in API 700. Thus, in one example of API 700, a set of application programming interfaces can be stored on a computer-readable medium. The interfaces can include, but are not limited to, a first interface 740 that communicates an order data including, for example, commodity data, a pickup window, a delivery window, an origin, a destination, and so on. The interfaces may also include a second interface 750 that communicates a shipment data including, for example, a set of orders, a pickup window, a delivery window, an origin, a destination, and so on. The interfaces may also include a third interface 760 that communicates a load data including, for example, a start time, a sequence of stops, and so on. The interfaces may also include a fourth interface 770 for communicating a drop trailer arrangement data including, for example, "while open" instructions, "while closed" instructions, a drop off trailer identifier, a pick up trailer identifier, and so on.

Figure 8:
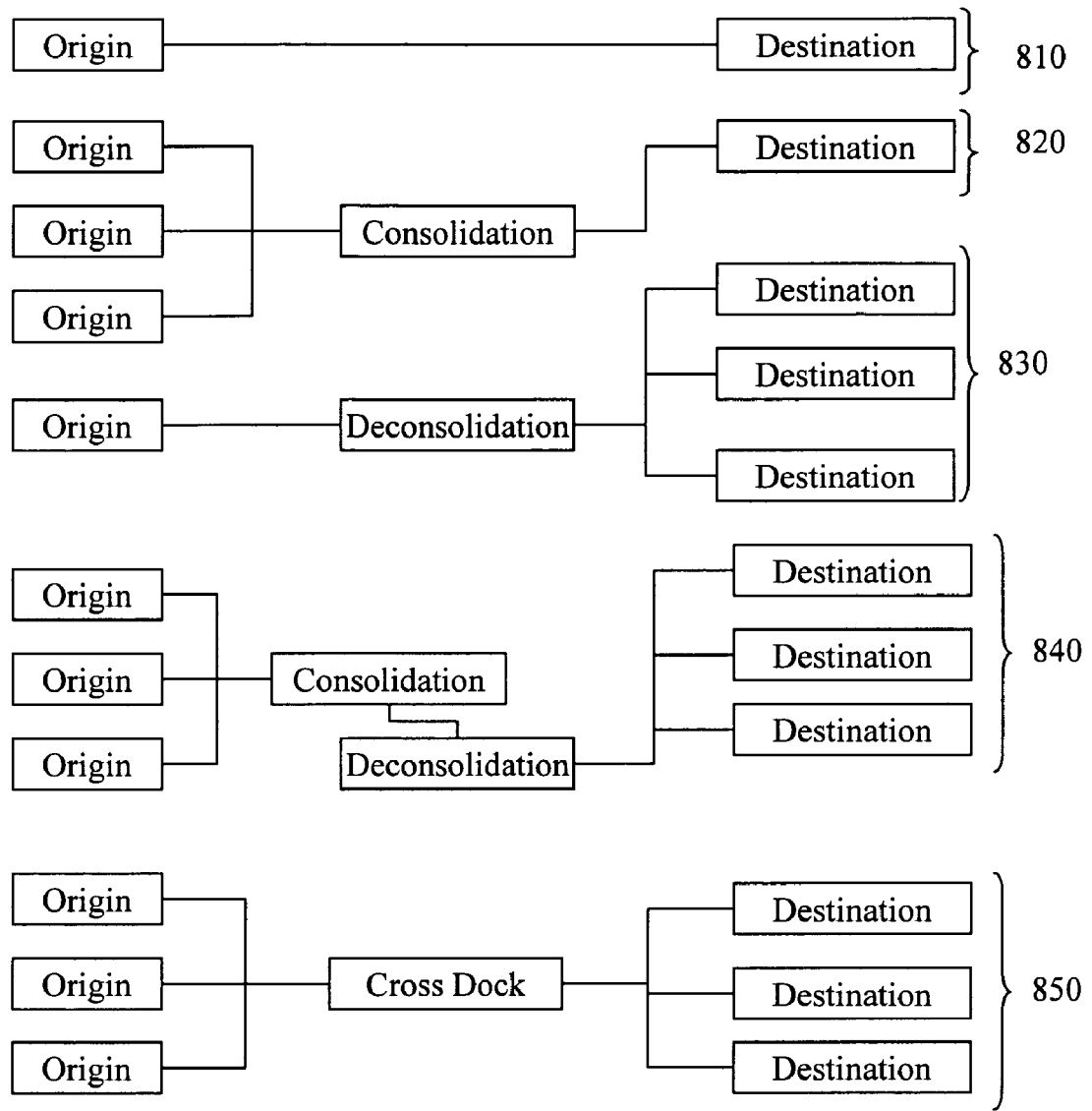
FIG. 8 illustrates example pooling scenarios.

FIG. 8 illustrates example pooling possibilities. Pooling possibilities may include, for example, simple consolidation 810 where orders with a common source and destination are placed on the same truck. Pooling possibilities may also include single tier pooling like inbound pooling 820 where orders for a common destination are brought to a consolidation point, consolidated, and sent to the common destination. Pooling possibilities may also include outbound pooling 830 where orders having a common source but different destinations are sent to a deconsolidation point and then broken down into smaller shipments. Pooling may also include multi-tier pooling 840 and cross-docking 850. While conventional systems and methods may investigate pooling possibilities when performing transportation planning, their investigations may neglect drop-trailer arrangements.

Figure 9:
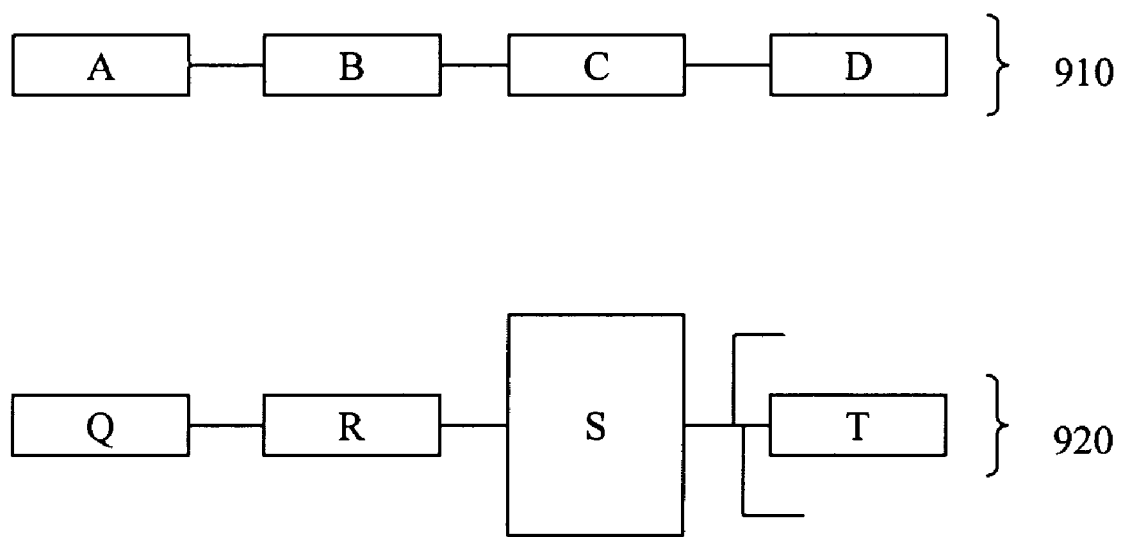
FIG. 9 illustrates example multi-stop load scenarios.

FIG. 9 illustrates other load scenarios. These possibilities include, for example, multi-stop load 910 and compound pooling, multi-stop load 920. In 910, a truck may make four stops including a pickup at A, and deliveries at B, C, and D. Additionally, at D, rather than live (un)loading, the trailer may be dropped off and another trailer may be picked up. In 920, a truck may make a pickup at Q, a delivery of a single shipment at R, a delivery of several shipments for several different destinations at deconsolidation point S, and then drop the trailer at T.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer-readable storage medium having computer-executable instructions stored thereon that when executed by a computer processor cause the computer processor to perform a method, the method comprising:

receiving a set of orders that describe one or more items to be delivered to one or more facilities as controlled, the set of orders being controlled, at least in part, by one or more order requirements;

accessing a transportation planning model that includes information concerning one or more modes and one or more carriers by which an order can be delivered to a facility, the transportation planning model also including drop trailer arrangement data concerning the facilities and the carriers;

selectively consolidating one or more orders into one or more shipments based, at least in part, on the transportation planning model and the availability of a drop trailer arrangement;

selectively assigning one or more shipments to one or more loads based, at least in part, on the transportation planning model and the availability of a drop trailer action, where a load includes a drop trailer action; and providing an actionable plan of loads for delivering the one or more shipments to the one or more facilities.

2. The computer-readable storage medium of claim 1, where the actionable plan facilitates improving a utility measurement associated with satisfying the set of orders as compared to an actionable plan that does not consider drop trailer actions.

3. The computer-readable storage medium of claim 1, where the actionable plan facilitates optimizing a utility measurement associated with satisfying the set of orders.

4. The computer-readable storage medium of claim 1, where the order requirements include one or more of, an earliest pickup time, an earliest delivery time, a latest pickup time, a latest delivery time, a source, and a destination.

5. The computer-readable storage medium of claim 1, where the transportation planning model includes data concerning one or more of, the modes, the carriers, rates, the facilities, and a transportation network.

6. The computer-readable storage medium of claim 1, where selectively consolidating one or more orders into one or more shipments includes identifying a consolidation opportunity using one or more of, a linear programming consolidation process, a simplex method consolidation process, a dynamic programming consolidation process, a greedy consolidation process, a look ahead consolidation process, a divide and conquer consolidation process, a branch and bound process, a savings-based process, and a heuristic-based process.

7. The computer-readable storage medium of claim 6, where a consolidation opportunity includes one or more of, a simple consolidation opportunity, a single tier pooling opportunity, a multi- tier pooling opportunity, a cross docking opportunity, a multi-stop load opportunity, a continuous move opportunity, and a compound multi-stop load opportunity.

8. The computer-readable storage medium of claim 1, where selectively assigning one or more shipments to one or more loads includes identifying a routing opportunity using one or more of, a linear programming routing process, a simplex method routing process, a dynamic programming routing process, a greedy routing process, a look ahead routing process, a divide and conquer routing process, a branch and bound process, a savings-based process, and a heuristic-based process.

9. The computer-readable storage medium of claim 8, where a routing opportunity includes one or more of, a single stop route opportunity, a multi-stop route opportunity, and a continuous move opportunity, where a routing opportunity includes a drop-trailer action.

10. The computer-readable storage medium of claim 1, where a load is described by a load data that includes one or more of, a start time, a start location, a sequenced set of stops, a drop trailer instruction, a pickup trailer instruction, and a set of shipments.

11. The computer-readable storage medium of claim 2, where improving the utility measurement includes one or more of, reducing a load cost, reducing an order cost, improving order compliance with one or more of, a rule, a law, and a preference, improving truck percentage utilization, reducing a spoilage amount, reducing a breakage amount, and improving on time delivery.

12. The computer-readable storage medium of claim 11, where reducing an order cost includes one or more of, acquiring a lower unit cost for an order, moving an order from a parcel mode to a truckload mode, and moving an order from a less than truckload mode to a truckload mode.

13. The computer-readable storage medium of claim 3, where optimizing the utility measurement includes one or more of, reducing a load cost, reducing an order cost, improving order compliance with one or more of, a rule, a law, and a preference, improving truck percentage utilization, reducing a spoilage amount, reducing a breakage amount, and improving on time delivery.

14. The computer-readable storage medium of claim 13, where reducing an order cost includes one or more of, acquiring a lower unit cost for an order, moving an order from a parcel mode to a truckload mode, and moving an order from a less than truckload mode to a truckload mode.

15. The computer-readable storage medium of claim 1, the method including relaxing a constraint associated with facility operation times based, at least in part, on considering a drop trailer action.

16. The computer-readable storage medium of claim 1, the actionable plan being stored on a computer-readable medium.

17. The computer-readable storage medium of claim 1, where a load may be reconfigured after shipments have been assigned to the load based on analyzing a drop trailer arrangement data concerning both the facility and the carrier associated with the load.

18. The computer-readable storage medium of claim 1, where a load may initially be configured based, at least in part, on analyzing drop trailer arrangement data concerning both the facilities and the carriers available for the load.

19. A computer-readable storage medium having computer-executable instructions stored thereon that when executed by a computer processor cause the computer processor to perform a method, the method comprising:
  receiving a set of orders that describe one or more items to be delivered to one or more facilities as controlled, the set of orders being controlled, at least in part, by one or more order requirements, where the order requirements include one or more of, an earliest pickup time, an earliest delivery time, a latest pickup time, a latest delivery time, a pickup source, and a delivery destination;
  accessing a transportation planning model that includes information concerning one or more modes and one or more carriers by which an order can be delivered to a facility, the transportation model also including drop trailer arrangement data concerning the facilities and the carriers, where the transportation planning model includes data concerning one or more of, the modes, the carriers, rates, the facilities, and a transportation network;
  selectively consolidating one or more orders into one or more shipments based, at least in part, on the transportation model and the availability of a drop trailer arrangement, where selectively consolidating one or more orders into one or more shipments includes identifying a consolidation opportunity using one or more of, a linear programming consolidation process, a simplex method consolidation process, a dynamic programming consolidation process, a greedy consolidation process, a look ahead consolidation process, a divide and conquer consolidation process, a branch and bound process, a savings-based process, and a heuristic-based process, where a consolidation opportunity includes one or more of, a simple consolidation opportunity, a single tier pooling opportunity, a multi-tier pooling opportunity, a cross docking opportunity, a continuous move opportunity, a multi-stop load opportunity, and a compound multi-stop load opportunity;
  selectively assigning one or more shipments to one or more loads based, at least in part, on the transportation model and the availability of a drop trailer arrangement, where a load includes a drop trailer action, where selectively assigning one or more shipments to one or more loads includes identifying a routing opportunity using one or more of, a linear programming routing process, a simplex method routing process, a dynamic programming routing process, a greedy routing process, a look ahead routing process, a divide and conquer routing process, a branch and bound process, a savings-based process, and a heuristic-based process, where a routing opportunity includes one or more of, a single stop route opportunity, a multi-stop route opportunity, and a continuous move opportunity, and a drop-trailer arrangement; and
  providing an actionable plan of loads for delivering the one or more shipments to the one or more facilities, where the actionable plan facilitates one or more of, improving a utility measurement associated with satisfying the set of orders as compared to an actionable plan that does not consider drop trailer actions, and optimizing a utility measurement associated with satisfying the set of orders, where improving the utility measurement includes one or more of, reducing a load cost, reducing an order cost, improving order compliance with one or more of a rule, a law, and a preference, improving truck percentage utilization, reducing a spoilage amount, reducing a breakage amount, and improving on time delivery, where reducing an order cost includes one or more of, acquiring a lower unit cost for an order, moving an order from a parcel mode to a truckload mode, and moving an order from a less than truckload mode to a truckload mode, where a load may initially be configured based, at least in part, on analyzing drop trailer arrangement data concerning the facilities and the carriers and where a load may be reconfigured after it is established based on analyzing drop trailer arrangement data concerning the facilities and the carriers.

20. A system, comprising:
a processor;
a data store operably coupled to the processor and configured to store an order that describes an item to be delivered to a facility in accordance with an order requirement;
a model logic configured to cause the processor to access a shipping model, where the shipping model describes shipping modes, carriers, facilities, a transportation network, and drop trailer arrangements between the facilities and the carriers;
a consolidation logic operably connected to the data store, the processor, and the model logic, the consolidation logic being configured to cause the processor to consolidate orders into shipments based, at least in part, on the shipping model and the availability of drop trailer possibilities; and
a load logic operably connected to the consolidation logic, the processor, and the model logic, the load logic being configured to cause the processor to assign shipments to loads based, at least in part, on the shipping model and the availability of drop trailer possibilities, where a load includes a drop trailer action that facilitates violating a facility operation time constraint described in the shipping model.

21. The system of claim 20, where the shipping model includes data concerning one or more of, drop trailer arrangements, transportation network configuration, equipment capacity, transit times, commodity-commodity compatibility, commodity-equipment compatibility, commodity-facility compatibility, commodity-carrier compatibility, facility-equipment compatibility, carrier rules, carrier limits, hours of service laws, facility operation days, facility operation hours, equipment availability, driver availability, facility capacity, carrier pickup lead times, and elements of an order that are supposed to remain together throughout the time and geographical extent that the elements are in transit.

22. The system of claim 21, where the consolidation logic is configured to identify a consolidation opportunity using one or more of, a linear programming selection process, a simplex method selection process, a dynamic programming selection process, a greedy selection process, a look ahead selection process, a divide and conquer selection process, a branch and bound process, a savings-based process, and a heuristic-based process, where a consolidation opportunity includes one or more of, a simple consolidation opportunity, a single tier pooling opportunity, a multi-tier pooling opportunity, a cross docking opportunity, a multi-stop load opportunity, a continuous move opportunity, and a compound multi-stop load opportunity; and where the consolidation logic consolidates orders based, at least in part, on the consolidation opportunities.

23. The system of claim 22, where the load logic is configured to identify a routing opportunity using one or more of, a linear programming process routing, a simplex method routing process, a dynamic programming routing process, a greedy routing process, a look ahead routing process, a divide and conquer routing process, a branch and bound process, a savings-based process, and a heuristic-based processes, where a routing opportunity includes one or more of, a single stop route opportunity, a multi-stop route opportunity, and a continuous move opportunity, and a drop-trailer arrangement, and where the load logic assigns shipments to loads based, at least in part, on the routing opportunity.

24. The system of claim 23, including a re-evaluation logic configured to reconfigure a load based on the availability of a drop trailer arrangement.

* * * * *

UNITED STATES PATENT AND TRADEMARK OFFICE
CERTIFICATE OF CORRECTION

PATENT NO. : 7,672,855 B2
APPLICATION NO. : 11/067154
DATED : March 2, 2010
INVENTOR(S) : Roy I. Peterkofsky et al.

It is certified that error appears in the above-identified patent and that said Letters Patent is hereby corrected as shown below:

In column 1, line 7, delete "Is" and insert -- is --, therefor.

In column 1, line 10, delete "Resolutions"," and insert -- Resolution", --, therefor.

In column 1, line 11, delete "Goassens" and insert -- Goossens --, therefor.

In column 1, line 13, delete "Peterkofaky" and insert -- Peterkofsky --, therefor.

In column 4, lines 12-13, delete "computer readable" and insert -- computer-readable --, therefor.

In column 4, line 24, delete "computer readable" and insert -- computer-readable --, therefor.

In column 4, line 61, delete "servelet" and insert -- servlet --, therefor.

In column 12, line 40, delete "order" and insert -- orders. A first order --, therefor.

In column 12, line 41, delete "orders. A first D1." and insert -- D1. --, therefor.

In column 18, line 41, in claim 7, delete "multi- tier" and insert -- multi-tier --, therefor.

In column 22, line 17, in claim 23, delete "drop- trailer" and insert -- drop-trailer --, therefor.

Signed and Sealed this

Twenty-eighth Day of September, 2010

David J. Kappos
*Director of the United States Patent and Trademark Office*